United States Patent
Murray et al.

(10) Patent No.: US 7,121,011 B2
(45) Date of Patent: Oct. 17, 2006

(54) CAMERA TECHNIQUE FOR ADAPTIVE CRUISE CONTROL (ACC) SENSOR ADJUSTMENT

(75) Inventors: Patrick Murray, Birmingham (GB); David Jackson, Point Roberts, WA (US)

(73) Assignee: Snap-On Incorporated, Kenosha, WI (US)

( * ) Notice: Subject to any disclaimer, the term of this patent is extended or adjusted under 35 U.S.C. 154(b) by 74 days.

(21) Appl. No.: 10/840,431

(22) Filed: May 7, 2004

(65) Prior Publication Data

US 2005/0096807 A1 May 5, 2005

Related U.S. Application Data

(60) Provisional application No. 60/468,999, filed on May 9, 2003.

(51) Int. Cl.
*G01B 11/275* (2006.01)
(52) U.S. Cl. .................... 33/288; 33/203.18; 356/155
(58) Field of Classification Search ............... 33/288, 33/281, 282, 285, 286, 600, 203.15, 203.16, 33/203.17, 203.18, 203.19, 203.2; 356/139.09, 356/144, 155
See application file for complete search history.

(56) References Cited

U.S. PATENT DOCUMENTS

| | | | |
|---|---|---|---|
| 5,535,522 A | 7/1996 | Jackson | |
| 5,724,743 A | 3/1998 | Jackson | |
| 5,809,658 A | 9/1998 | Jackson et al. | |
| 5,943,783 A | 8/1999 | Jackson | |
| 6,020,844 A | 2/2000 | Bai et al. | |
| 6,043,875 A | 3/2000 | Samuelsson | |
| 6,087,995 A | 7/2000 | Grace et al. | |
| 6,115,927 A * | 9/2000 | Hendrix | 33/288 |
| 6,329,952 B1 | 12/2001 | Grace | |
| 6,363,619 B1 * | 4/2002 | Schirmer et al. | 33/288 |
| 6,583,868 B1 * | 6/2003 | Hopfenmuller | 356/139.09 |
| 6,636,172 B1 | 10/2003 | Prestl et al. | |
| 6,823,601 B1 | 11/2004 | Murray | |
| 2001/0008446 A1 | 7/2001 | Hopfenmuller | |
| 2004/0049930 A1 | 3/2004 | Murray | |

(Continued)

FOREIGN PATENT DOCUMENTS

DE 196 42 811 4/1998

(Continued)

OTHER PUBLICATIONS

TruckCam, Autotechnica Belgium, Apr. 20, 2002, Camera Wheel Alignment System.

*Primary Examiner*—R. Alexander Smith
(74) *Attorney, Agent, or Firm*—McDermott Will & Emery LLP

(57) ABSTRACT

An image processing type aligner enables proper set-up of one of two adjustment elements used to align an adaptive cruise control sensor or the like mounted on a vehicle. One element, such as a laser beam source, is mounted with the sensor on the vehicle; and the other element, such as a mirror, is mounted on a stand. A carrier on the stand positions at least one image sensor of the aligner system. The stand is positioned in front of the vehicle and manipulated until the aligner indicates that the axis of the adjustment element on the stand is aligned relative to a desired line of the vehicle, for example, the thrust line. A beam of light is transmitted between the two adjustment elements, and the technician adjusts the sensor until the beam position indicates a desired alignment of the sensor relative to the line of the vehicle.

18 Claims, 7 Drawing Sheets

U.S. PATENT DOCUMENTS

2005/0041847 A1* 2/2005 Dorrance et al. .......... 382/141

FOREIGN PATENT DOCUMENTS

| DE | 198 57 871 C1 | 10/2000 |
| DE | 101 14 799 A1 | 10/2002 |
| EP | 0 984 297 A2 | 3/2000 |
| EP | 1 260 832 A1 | 11/2002 |
| EP | 0 905 526 | 12/2003 |
| WO | WO 2004/102114 | 11/2004 |

* cited by examiner

CAMERA TECHNIQUE FOR ADAPTIVE CRUISE CONTROL (ACC) SENSOR ADJUSTMENT

RELATED APPLICATION

This application claims the benefit of U.S. Provisional Application No. 60/468,999 Filed May 9, 2003 entitled "CAMERA TECHNIQUE FOR ADAPTIVE CRUISE CONTROL (ACC) SENSOR ADJUSTMENT," the disclosure of which is entirely incorporated herein by reference.

TECHNICAL FIELD

The present subject matter relates to techniques and equipment to adjust the alignment of a vehicle mounted sensor, typically the leading vehicle sensor of an adaptive cruise control system, in part using an image processing type aligner, such as a 3D visual system otherwise used for alignment of the wheels of the host vehicle.

BACKGROUND

Adaptive cruise control systems provide an adaptive vehicle speed control, based on sensing of another vehicle or target in front of the host vehicle within which the cruise control operates. Cruise control normally controls host vehicle speed to minimize a difference between actual vehicle speed and a driver-set speed. The adaptive speed control senses the presence of a vehicle or the like in front of the host vehicle and adjusts the cruise control algorithm to account for the target preceding the host vehicle, for example to reduce host vehicle speed and maintain a set distance between the vehicles. A number of different types of automobile manufacturers offer such adaptive cruise control as a comfort aid for driving.

Adaptive cruise control (ACC) systems typically utilize a radar or laser sensor or the like to detect the presence of and distance to a target vehicle leading the host vehicle on which the sensor and the ACC system are mounted. Adaptive cruise control sensors are now commonly mounted on motor vehicles, such as cars, trucks, lorries, vans and the like. Such an adaptive cruise control sensor is located to the front of the host vehicle, generally in the front bumper, and directs a radar beam forwardly in the direction of forward motion of the motor vehicle. Based on the return signal, whenever the sensor detects another vehicle in front of and in the path of the host vehicle, which is moving at a speed slower than the speed of the host vehicle, the adaptive cruise control system determines the speed of the leading vehicle from the sensor signal. The control of the adaptive system sets the cruise speed of the host vehicle to the speed of the leading vehicle.

In order for such an adaptive cruise control system to operate properly, the sensor must be aligned with the vehicle thrust line, and implementation of such a system requires accurate alignment of the sensor with that thrust line. It is essential that the sensor axis, and thus the axis along which the sensor emits a radar or laser beam, extends parallel to the thrust line of the vehicle. In certain cases, the axis of the adaptive cruise control sensor may coincide with the thrust line, although in general, the axis of the adaptive cruise control sensor tends to be spaced apart from the thrust line, but must be parallel thereto.

The thrust line of a vehicle is determined by the toe of the rear wheels of the vehicle, and techniques for measurement thereof will be well known to those skilled in the art. It is a line that extends from the point of intersection of the rear transverse axis of the rear wheels and the longitudinal center line of the vehicle, and it extends forwardly of the vehicle at an angle to the center line of the vehicle. The angle that the thrust line makes with respect to the center line of the vehicle is determined by the toe of the rear wheels, and is relatively small.

Devices for aligning the axis of an adaptive cruise control sensor are known. In general, such a device comprises a mirror and a laser beam. An arrangement is provided for mounting the mirror or the laser light beam source forwardly of the vehicle for cooperating, with the other of the source and the mirror, which is mounted on the adaptive cruise control sensor. Typically, the laser light beam source is mounted on the adaptive cruise control sensor, and the source is arranged with its axis, and in turn, the axis at which the light beam is projected, extending parallel to and relatively close to the axis of the adaptive cruise control sensor. In this arrangement, the mirror is mounted on a separate stand or the like in front of the vehicle.

German published patent application DE 19857871 (C1) discloses a device for aligning the sensor of an adaptive cruise control system to the thrust line of the host vehicle. The disclosed device uses a laser source mounted on a frame positioned in front of the automobile, for directing a laser beam onto a mirror provided by the radar sensor perpendicular to the propagation direction of the radar beam. The rear wheels of the automobile have angle sources, which are used for alignment of the frame with the automobile longitudinal axis in conjunction with angle sources at the opposite sides of the frame, with correction of the radar sensor using evaluation of the reflected laser beam.

Where the mirror is the separately mounted element, it is essential that the mirror is aligned with the vehicle such that the mirror extends transversely across the vehicle thrust line, that is to say perpendicular to the thrust line. In general, it is difficult to locate the mirror so that it accurately extends perpendicular to the thrust line. In cases where the mirror is mounted on the adaptive cruise control sensor, the mirror is mounted transversely of the vehicle thrust line, and the laser light beam source is separately mounted. In this later case, the laser light beam source must be located with the axis of the light beam source extending parallel to the thrust line. It is often difficult to accurately align the laser light beam source on a mounting with the beam source axis extending parallel to the thrust line.

It is well known to align the front and rear wheels of a vehicle with alignment devices or systems. Modern wheel alignment systems, providing increased accuracy and ease of use, have relied on visible targets and computer processing of camera images of the wheel mounted visible targets. Such systems are often referred to as 3D image wheel aligner systems. Examples of methods and apparatus involving computerized image processing for alignment of motor vehicles are described in U.S. Pat. No. 5,943,783 entitled "Method and apparatus for determining the alignment of motor vehicle wheels;" U.S. Pat. No. 5,809,658 entitled "Method and apparatus for calibrating cameras used in the alignment of motor vehicle wheels;" U.S. Pat. No. 5,724,743 entitled "Method and apparatus for determining the alignment of motor vehicle wheels;" and U.S. Pat. No. 5,535,522 entitled "Method and apparatus for determining the alignment of motor vehicle wheels." A wheel alignment system of the type described in these references is sometimes called a "3D aligner" or "visual aligner." An example of a commercial vehicle wheel aligner is the Visualiner 3D, commercially available from John Bean Company, Conway, Ark., a unit of Snap-on Tools Company.

The prior adaptive cruise control sensor alignment devices, including that disclosed in DE 19857871 (C1), have been designed for use with older alignment measurement heads. In view of the increased accuracy and ease of use, it would be advantageous if the 3D type visual aligner systems could be used to also perform alignment of an adaptive cruise control sensor. The prior adaptive cruise control sensor alignment devices, however, do not work with the more modern 3D type visual aligner systems, due to limiting parameters of the 3D visual aligner and/or the sensor itself.

Hence a need exists for an apparatus for use with a visual aligner system, such as used for wheel alignments, to allow the aligner to also perform an alignment of the sensor of the adaptive cruise control system on a host vehicle. There is an attendant need for a method that facilitates the alignment of an adaptive cruise control sensor of a vehicle using a 3D image wheel aligner.

SUMMARY

Techniques and equipment are contemplated for aligning an adaptive cruise control sensor or the like mounted on a host vehicle, using a camera module of an image processing type aligner and a stand, to properly set-up at least one of the elements to perform the sensor adjustment.

One element, such as a laser beam source, is mounted with the sensor on the vehicle; and the other element, such as a mirror, is mounted on the stand. A carrier on the stand positions an image sensing module of the aligner system. The stand is positioned across a line of the vehicle. In the ACC example, the stand is positioned across the thrust line in front of the vehicle. The stand with the attached adjustment element is manipulated and signals from the image sensor are processed, until the aligner indicates that the axis of the adjustment element on the stand is aligned relative to the line of the vehicle. A beam, such as a laser or other light beam, is transmitted between the two adjustment elements, and the technician adjusts the sensor until the beam position indicates a desired alignment of the sensor relative to the line of the vehicle.

Hence, a system for aligning a control sensor mounted on a host vehicle might include an image processing aligner comprising one or more first image sensors and a processor for processing image signals to compute alignment parameters, for example, wheel alignment parameters. The system also includes optical targets, for mounting predetermined points on the vehicle and for imaging by the image processing aligner. Two adjustment elements cooperate so as to align an axis of the adaptive cruise control sensor parallel to a predetermined line of the host vehicle. A first one of these adjustment elements mounts in alignment with an axis of the adaptive cruise control sensor and for movement with adjustment of the sensor. The system further includes a second image sensor, for coupling to the processor of the image processing aligner. A stand is provided for location across the line of the host vehicle. The stand mounts the second one of the adjustment elements. The stand mounts the second image sensor so as to enable imaging of at least one of the targets. The processor of the aligner processes the signals from the second image sensor to facilitate alignment of the second optical adjustment element relative to the line of the host vehicle.

Three examples of the stand are disclosed. In the examples, the stand comprises a ground engaging member and a vertical pedestal supported on the ground engaging member. A support, mounted on the pedestal, carries the second one of the adjustment elements. A carrier bar, mounted on the support, enables attachment of the second image sensor at a location spaced apart from a vertical axis of the stand.

In a typical system, for adjustment of an ACC sensor, the two optical elements are a laser beam source and a mirror. The laser source may be on the stand or mounted with the ACC sensor. Similarly, the mirror may be the element on the stand or the element mounted in association with the ACC sensor.

Those skilled in the art will recognize that the techniques described herein may be adapted to other applications. For example, the stand, the auxiliary image sensor and the adjustment elements could be used in combination with a visual image processing type system to align other types of sensors, e.g. including other sensors that may now or in future appear at different locations on various types of vehicles.

Additional advantages and novel features of the examples will be set forth in part in the description which follows, and in part will become apparent to those skilled in the art upon examination of the following and the accompanying drawings or may be learned by production or operation of the examples. The advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

A system for aligning a vehicle mounted sensor, such as an adaptive cruise control sensor mounted on the front of a host vehicle, utilizes an image processing aligner. The aligner includes one or more image sensors and a processor for processing image signals from the image sensors so as to compute alignment parameters, for example, parameters relating to wheel alignment of the vehicle. The aligner uses two or more optical targets, which may be mounted on the vehicle. For a sensor-related application, the aligner also serves to align one or more optical adjustment elements used in the adjustment and alignment of the vehicle mounted control sensor.

Figure 6:
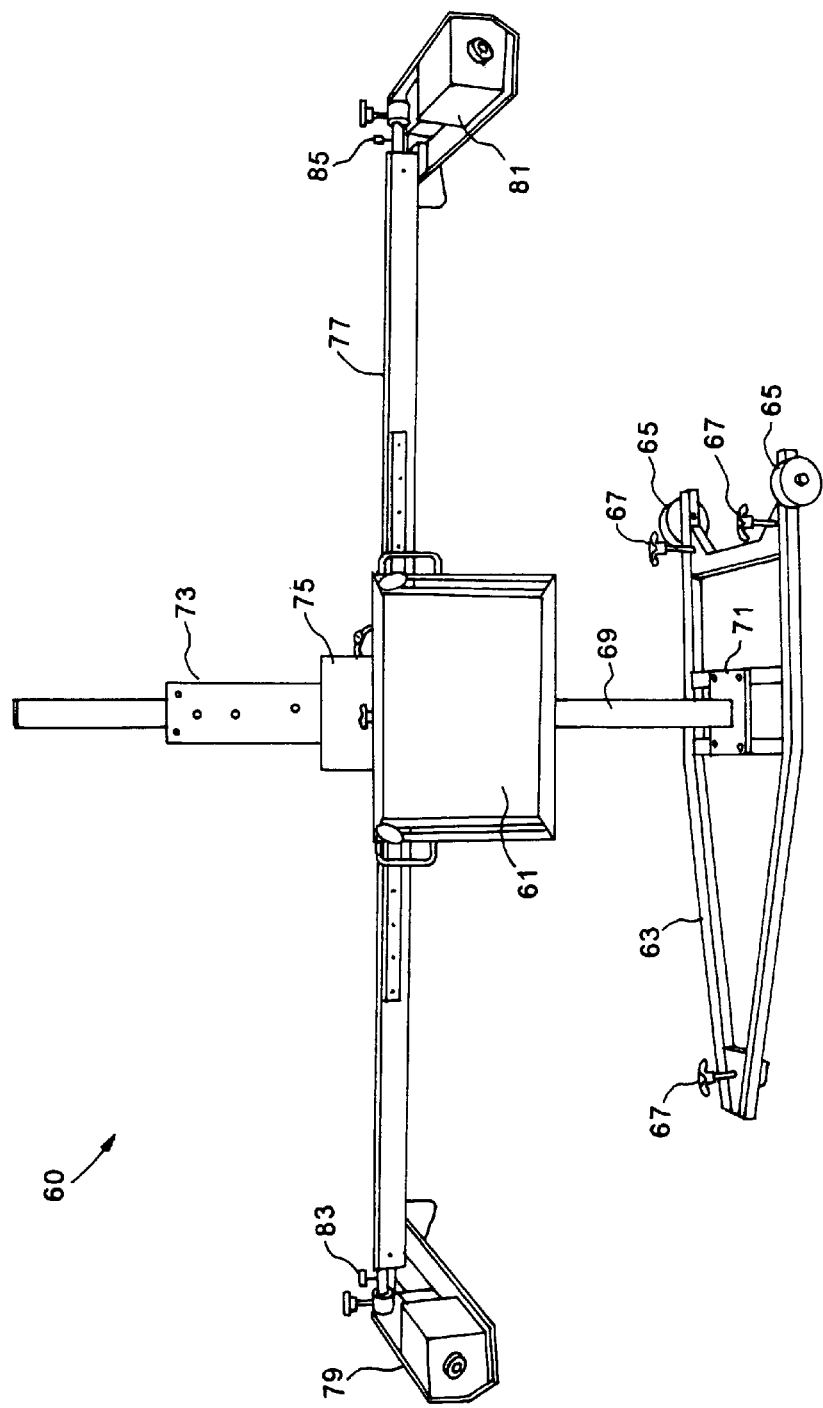
FIGS. 6 and 7 are front and back views of an example of a stand, an adjustment element and two camera modules of an image processing type wheel aligner for facilitating adjustment of an adaptive cruise control sensor.
Figure 7:
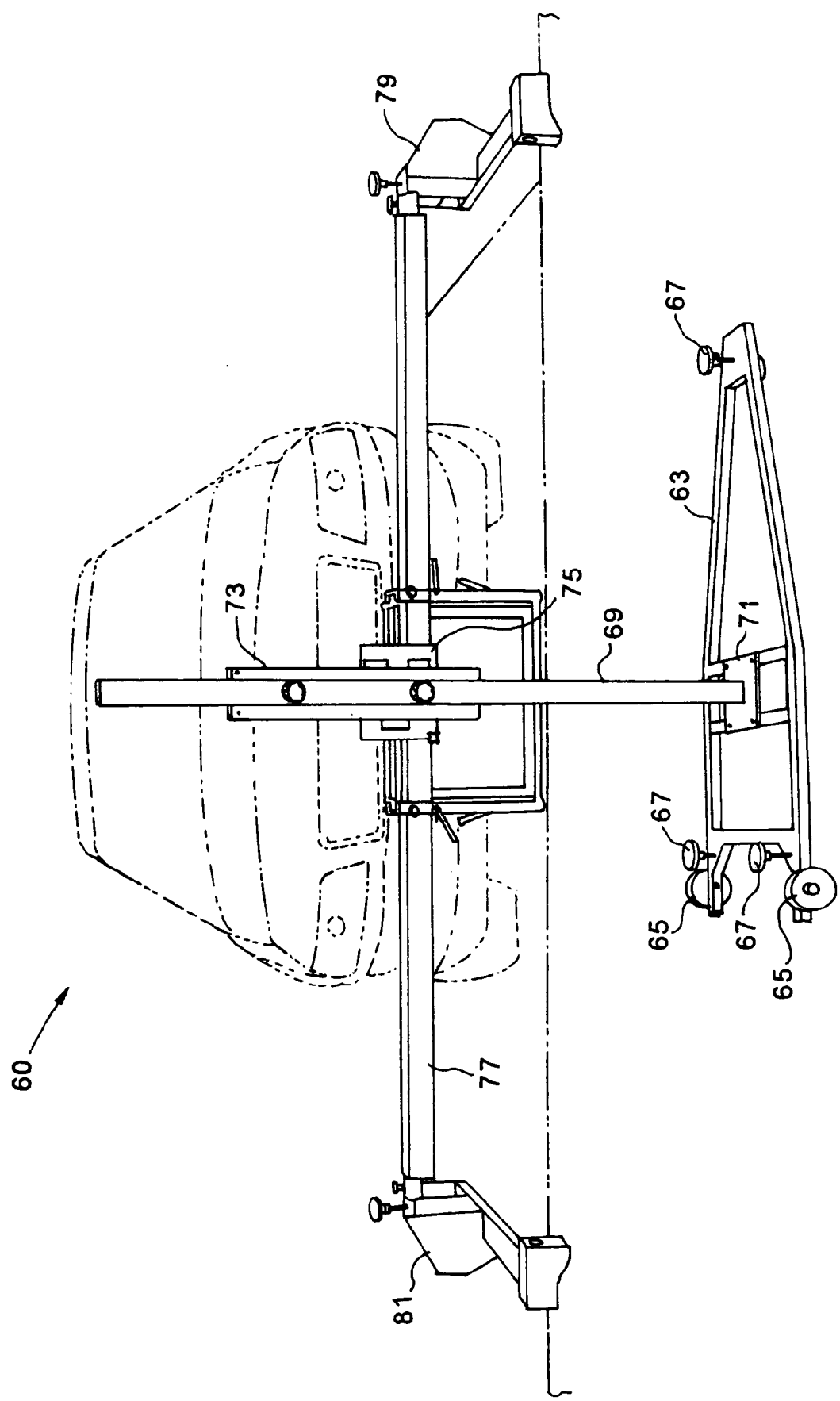

A first one of the adjustment elements is mountable in alignment with an axis of the sensor and for movement with adjustment of the sensor on the vehicle. The sensor alignment system also includes a stand for location across a line of interest of the host vehicle. The stand supports the second adjustment element. The stand also supports at least one image sensor, at a location transversely spaced apart from the adjustment element and/or an axis of the host vehicle, to enable imaging of the targets on the vehicle. Several examples of the stand structure will be discussed in detail, below, with respect to FIGS. 4 to 7. The examples of FIGS. 1 and 3 use one image sensor on the stand. However, the exemplary stands shown in FIGS. 4 to 7 may support image sensing modules at either or both ends of a cross-bar, and the example of FIGS. 6 and 7 is shown with two auxiliary image sensing modules. The aligner processes images from the image sensor(s) on the stand, to facilitate alignment of the second optical adjustment element relative to the line of interest from the host vehicle, for example, in relation to a thrust line of the vehicle.

Figure 1:
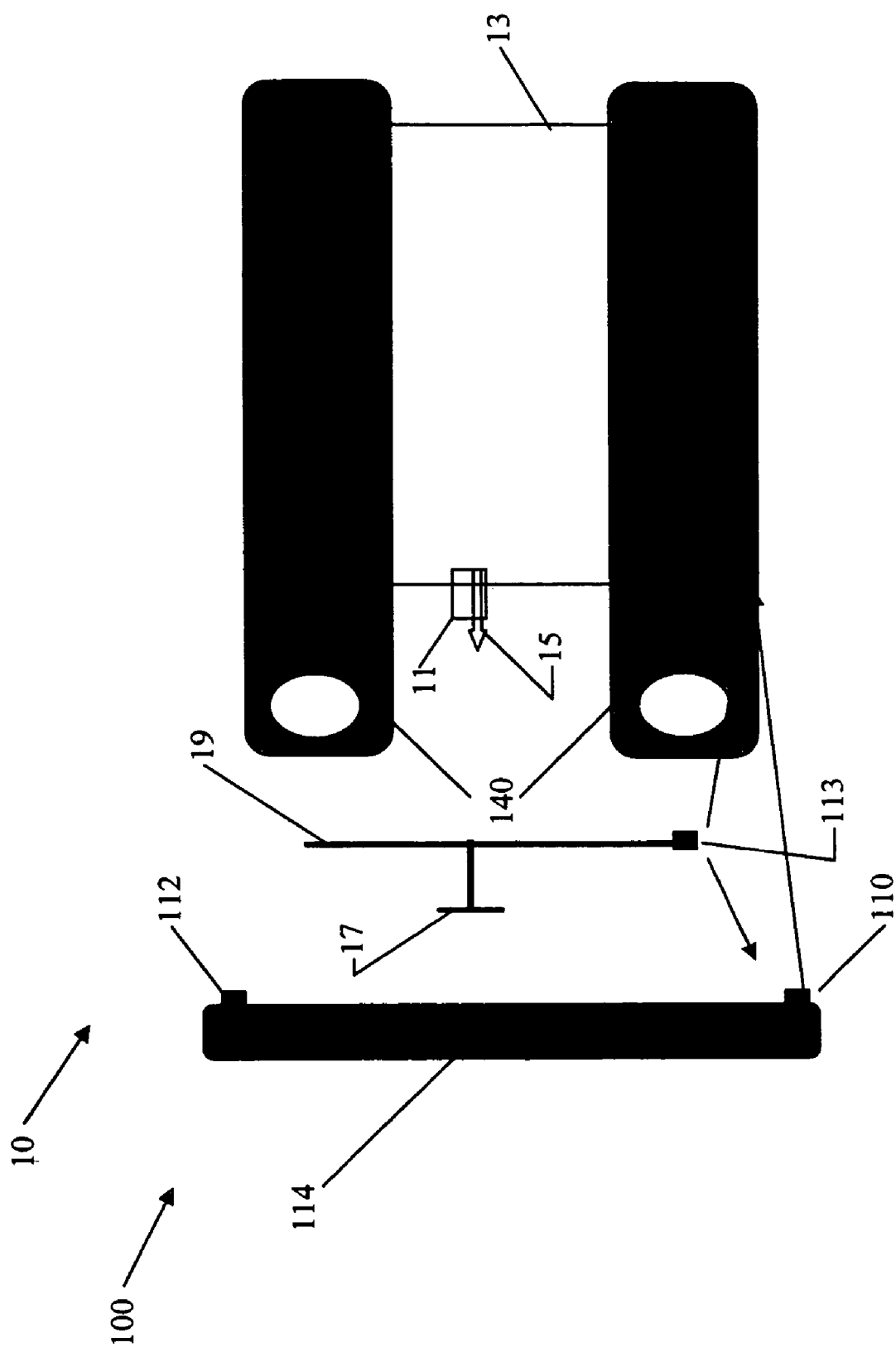
FIG. 1 is a diagrammatic plan view of an image processing type wheel aligner, stand and adjustment element, in use for adjusting the adaptive cruise control (ACC) sensor on the front of a host vehicle.

Referring to FIG. 1, there is illustrated a system 10 for adjusting the orientation of a sensor 11 mounted on the front of a host vehicle 13, while the vehicle is on ramps of a service rack 140. The sensor 11 typically is the radar or laser sensor or the like of an adaptive cruise control (ACC) system. The system 10 includes two optical sensor adjustment elements. In the example, a first element is of a laser beam source 15 (represented by the block arrow in the diagram) mounted with its beam emission parallel to the forward pointing axis of the ACC sensor 11 on the vehicle 13. In such an example, the second element 17 is a mirror for reflecting the laser beam. A stand 19 supports the mirror 17 in front of the vehicle 13, to reflect the beam from laser source 15. Examples are discussed later wherein the mirror is associated with the sensor 11, and the beam source is mounted on the stand.

The system 10 also includes a 3D imaging type aligner system 100, several portions of which are shown diagrammatically in FIG. 1. The exemplary aligner system 100 includes two image sensor modules 110 and 112 mounted near the opposite ends of a support beam 114. Aligner systems have used a single camera, and more modern systems may use three, four, five or even more cameras or image sensor modules. The vehicle sensor adjustment techniques may work with any of these 3D imaging type aligner systems, with one or any plural number of cameras in such image sensor modules. For ease of discussion, we will concentrate on examples using the two-module arrangement of the aligner system 100 shown in FIGS. 1–3.

The modules 110 and 112 include digital cameras or the like, as the actual image sensors. Each of image sensor modules 110 and 112 is oriented so that its respective field of view encompasses two wheels on the respective side of the vehicle 13. Optical targets are mounted on the wheels, as discussed below relative to FIG. 2, although for convenience, the targets are omitted from FIG. 1. A computer processes the signals from the image sensor modules 110 and 112 to determine target positions and derive alignment measurements for the vehicle 13 under test.

To adjust the ACC sensor 11, the second adjustment element, in this case the mirror 17 must be precisely aligned with respect to an axis of the vehicle 13. The wheel alignment system 100 therefore takes additional measurements to determine and allow adjustment of the stand 19 to achieve the correct orientation of the adjustment element on the stand, that is to say the mirror 17 in this example. In accord with the principles discussed herein, the aligner system 110 has at least one image sensor module 113 attached to the stand 19. One of the normal modules 110 or 112 could be detached from the support beam 114 and attached to the stand 19, but to maintain accurate system calibration, it is recommended here that the system 100 utilize a separate auxiliary camera or sensor module 113 mounted on the stand 19. In the example, one auxiliary sensor module 113 is used, but it may be convenient to use to two such modules (as shown in FIGS. 6 and 7).

Hence, the ACC sensor adjustment method involves attachment of at least one auxiliary image sensor module at one or more points on the stand, for example attachment of the image sensor module 113 to one side of the stand 19. In this position, the camera in the module 113 is able to view one or more of the aligner's targets (see FIG. 2). By doing so, the processing of the signals from the auxiliary camera in the module 113, in the same manner as for the other aligner cameras, is able to determine the positions and orientations of these targets in its own coordinate system.

Through performing a normal wheel alignment, the aligner 100 is capable of determining the positions and orientations of the targets viewed by its cameras (in modules 110 and 112) in the coordinate system of the aligner. By doing so, the aligner system 100 will also have determined the thrust line of the vehicle 13, using the measurements of toe of the rear wheels. After such normal alignment measurements, the stand 19 with second sensor element 17 may be placed between the vehicle 13 and the aligner beam 114. The auxiliary image sensor module 113 is attached to either end of the bar on the stand 19. The auxiliary camera in module 113 then provides images of the targets of front or back wheels on its side of vehicle 13, and the computer in the aligner system 100 determines the positions of the front target or both front and rear targets on its side. This position determination is relative to the auxiliary camera's coordinate system.

With the aligner already having the positions and orientations of the targets in the aligner coordinate system, it is possible to derive similar data from images from the auxiliary camera and then determine the position and orientation of the auxiliary camera's coordinate system in relation to the coordinate system of the aligner system 100. If the orientation of the auxiliary camera (in module 113) is known with respect to the stand 19 (and the second adjustment element 17), then it is also possible to determine the position of the device 19 with respect to the aligner's coordinate system. Using this information enables the aligning of the stand 19 perpendicular to the thrust line of the vehicle 13.

To determine the orientation of the auxiliary camera with respect to the stand 19, it will be necessary to calibrate the relationship of the auxiliary camera to the bar of the device. A special bracket may be required to attach the camera to the bar, although this bracket may be similar to mounting elements typically used to attach modules 110 and 112 to the beam 114.

The concepts discussed herein are applicable in a variety of different types of image processing alignment systems, for vehicles and the like. Presumably, those skilled in the art are familiar with the structure and operation of such machine vision alignment systems. However, it may be helpful to consider a specific example of a machine vision system, such as a 3D wheel aligner as illustrated in FIGS. 2 and 3.

In the example shown, the aligner system 100 consists of three major components. The first of these elements is an illumination and imaging system 102. This portion of the system comprises two imaging modules 110, 112. Each of the imaging modules 110, 112 includes a light emitter or illumination system (typically a strobe). Each of the imaging modules 110, 112 also includes an image sensor, typically in the form of a digital camera. CCD or CMOS based cameras may be used. Essentially, each camera forms an image of objects within its field of view, which in operation includes one or more targets; and in response to the image each camera generates digital image data. Circuitry in the module formats the digital image signal and may perform some pre-processing, and then sends the resultant data to a host computer 111.

Each light emitter takes the form of an array of strobed (flashing) red LEDs mounted around the aperture of one of the cameras. The exemplary system uses high-resolution digital cameras. The imaging modules 110 and 112 are mounted at opposite ends of a horizontal beam 114. In the wheel alignment application, the beam provides desired separation between the modules, to allow the desired view of the vehicle wheels from opposite sides. The height of the beam, and thus the height of the cameras in the modules 110 and 112, may be fixed or adjustable. The structure of the beam 114 and the structure for supporting the beam 114 are not significant for purposes of this discussion. Those skilled in the art will recognize that machine vision applications, including wheel alignment, may use a single imaging module or use more than the two modules 110, 112 shown in the example. For ACC sensor adjustment, the system includes at least one auxiliary module 113. The structure and operation of the module 113 are generally the same as those of the modules 110, 112.

Figure 2:
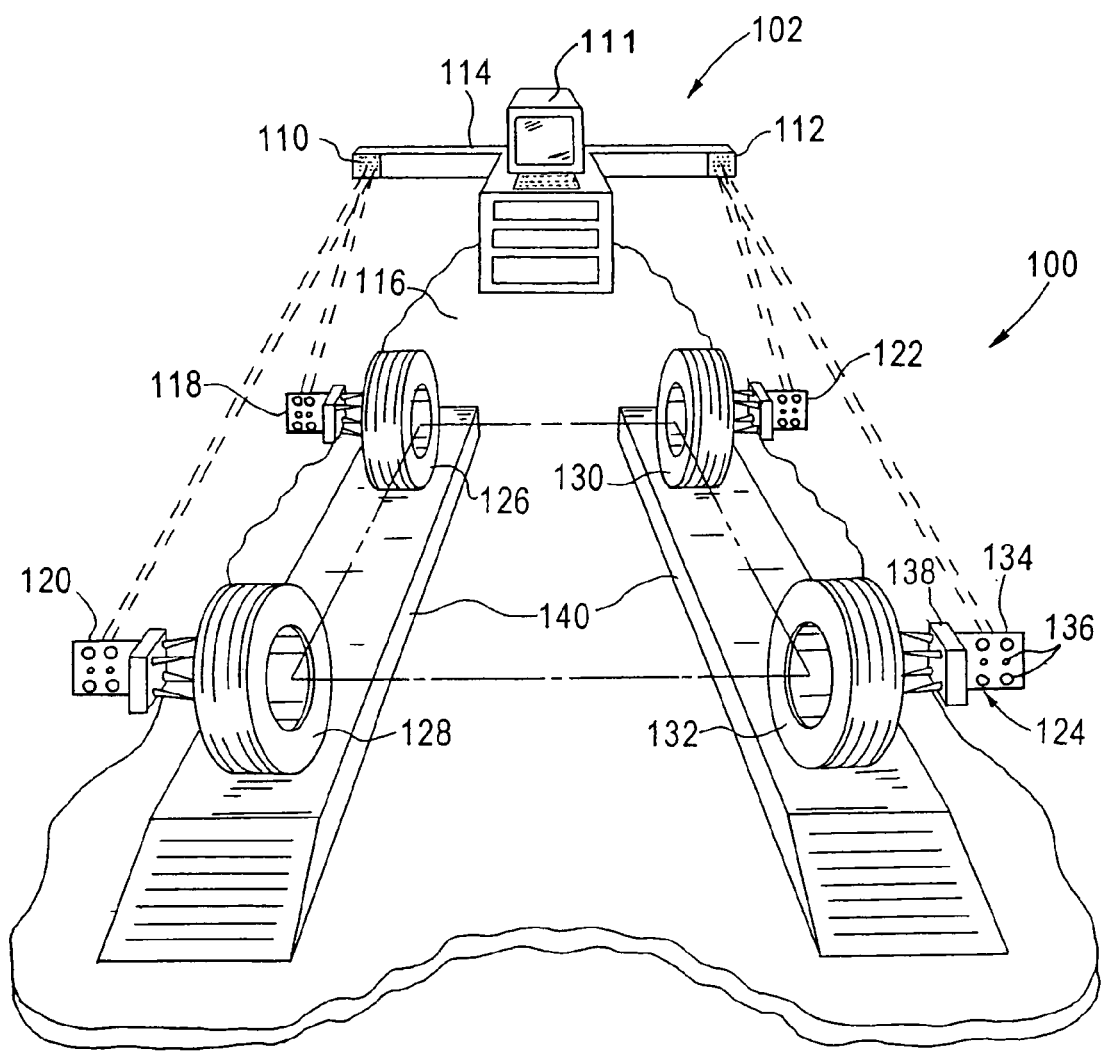
FIG. 2 is a perspective view of an image processing type wheel alignment system shown in relation to the wheels of a vehicle (vehicle body not shown) and the supporting platform.
Figure 3:
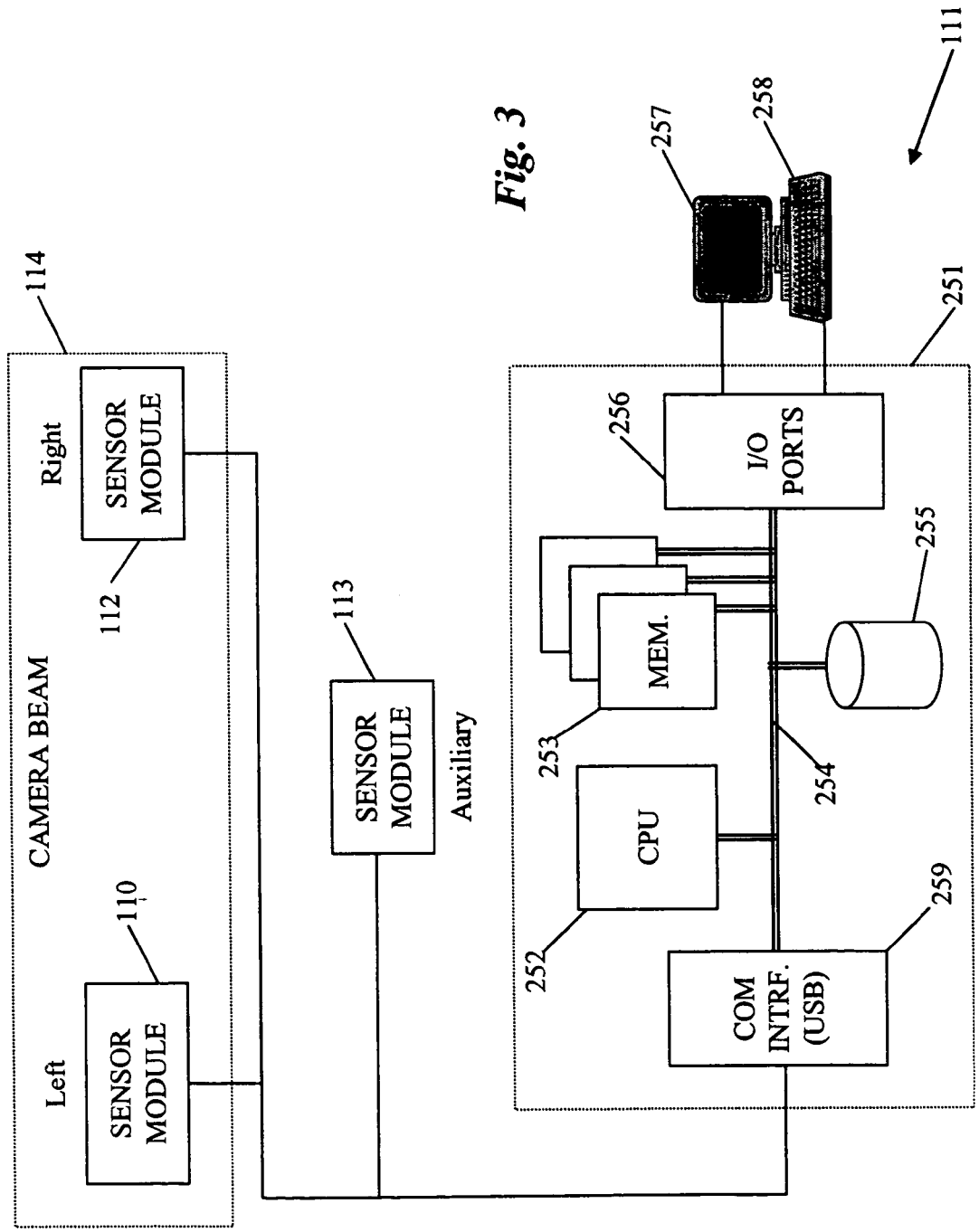
FIG. 3 is a simplified functional block diagram of the image processing components of the aligner of FIGS. 1 and 2.

The second major element of the aligner 3D system is a set of four passive heads, 118, 120, 122 and 124 for attachment to the vehicle wheels 126, 128 130 and 132 (see FIG. 2). Each head includes a wheel-rim clamp and an attached target object. In the example, each target object has a planar surface with a plurality of visually perceptible, geometrically configured, retro-reflective target elements, which appear as a pattern of reflective circles or dots of different sizes on the planar surface. Examples of target bodies 134 and target elements 136 acceptable for use in wheel alignment applications are described in U.S. Pat. No. 5,724,743. Other target designs may be used for wheel alignment, for example with different visually perceptible target elements 136.

In the wheel alignment application, targets 118, 120, 122, 124 are mounted on each of the wheels 126, 128, 130, 132 of the motor vehicle. Each target 118, 120, 120, 124 includes a target body 134, target elements 136, and an attachment apparatus 138. The target elements 136 are positioned on the target body 134. The attachment apparatus 138 attaches the target 118, 120, 120, 124 to wheel 126, 128, 130, 132, respectively. An example of an attachment apparatus is described in U.S. Pat. No. 5,024,001, entitled "Wheel Alignment Rim Clamp Claw" issued to Borner et al. on Jun. 18, 1991, incorporated herein by reference. Of course other mounting arrangements may be used.

The beam 114 supporting the imaging modules 110 and 112 has a length sufficient to position the cameras in the modules 110, 112 respectively outboard of the sides of the vehicle to be imaged by the position determination system 100. Also, the beam 114 positions the cameras in the modules 110, 112 high enough above the wheels to ensure that the two targets 118, 120 on the left side of the vehicle are both within the field of view of the left side camera in module 110, and the two targets 122, 124 on the right side of the vehicle are both within the field of view of the right side camera in module 112.

The other major element of the aligner system 100 is a programmed computer or host 111, typically a personal computer or similar programmable data processing device. In a typical implementation, the computer 111 includes a processor, a keyboard, a mouse, a printer and a color display monitor, as will be discussed in more detail, later. In the wheel alignment example, the computer 111 is programmed to receive and process the image data from the imaging modules 110 and 112. The host computer 111 processes the received data to calculate alignment parameters for a vehicle and to provide a graphical three-dimensional representation of those parameters as a display to a mechanic. In general, the host processing system 111 processes digital image information to derive positional data regarding position of the visually perceptible target elements from the camera images; and the host processing system 111 processes the positional data to determine one or more wheel alignment parameters of the vehicle under test. The computer 111 also offers a variety of other information useful in adjusting vehicle alignment. The computer also provides the user interface for operation of the system.

In operation, once the wheel aligner system 100 has been calibrated in a known manner, a vehicle 13 can be driven onto the rack 140, and, if desired, the vehicle lifted to an appropriate repair elevation. The targets 118, 120, 122, 124, once attached to the wheel rims, are then oriented so that the target elements 136 on the target body 134 face the camera in the respective module 110 or 112. The camera height may be fixed or adjustable to correspond to lift height. The vehicle and model year can then be entered into the computer 111 along with other identifying parameters, such as vehicle VIN number, license number, owner name, etc.

To take measurements, the mechanic begins by operating the system 100 to take a first set of images of the targets 118, 120, 122 and 124. The mechanic then rolls the vehicle back a slight distance, up to eight inches; and the system 100 takes another set of images of the targets 118, 120, 122 and 124. Finally, the mechanic rolls the vehicle forward to its initial position, and the system 100 takes more images. For each of the images, the respective module 110 or 112 may perform pre-processing of the image data, and the module forwards the to the host computer 111 for further processing. For example, from the position and orientation of the target in the images taken at the various positions, the computer 111 calculates the actual position and orientation of each wheel axis, including certain alignment parameters such as toe, camber, thrust angle and setback.

In the exemplary system 100, one camera is referenced to the other, so that the host computer 111 utilizes a single coordinate system for modeling the vehicle 13 under test. This single coordinate system becomes the coordinate system of the aligner, as will be used later in the ACC sensor adjustment. It is not necessary that the supporting rack 140 be level or even that all wheels lie within the same plane. For each vehicle, the computer 111 defines a reference plane that passes through the centers of rotation of the wheels (called "claw points" because they are the center of the points where the claws of the target assembly grip the wheel rims) as determined from the two test images taken at different positions of the wheels. Since one of these claw points may not lie in the plane defined by the other three, some liberties must be taken. For example, for the purpose of aligning the front wheels 126, 130, the computer 111 defines a reference plane as that formed by the measured claw point location of each of the two front wheels and a point midway between the measured claw point locations of the rear wheels 128, 132. Front wheel alignment calculations then are referenced to this individually measured plane. A similar technique may be used to reference measurements and adjustments with respect of the rear wheels.

The front wheels 126, 130 of the vehicle may rest on turntables (not shown), so that the mechanic can operate the steering wheel of the vehicle to change the positions of the front wheel during alignment operations. For example, the mechanic will operate the system 100 to take an image of the targets 118, 120, 122 and 124 with the wheels 126, 130 turned to one side. The mechanic then turns the wheels 126, 130 to the other side; and the system 100 takes another image of the targets 118, 120, 122 and 124. From the position and orientation of the front targets 118, 120 in these images taken at the two turned positions, the computer 111 calculates the steering axis about which each front wheel 126 or 130 turns.

Once all measurements are complete, the computer 111 generates a visual output of the measured alignment parameters and/or provides data relating to adjustments needed to bring the alignment parameters back to original manufacturer's specifications. The computer 111 stores manufacturers' specified values and tolerances for the alignment parameters, and retrieves the appropriate information based on the make and model information input by the mechanic. The mechanic may take corrective action, for example, by making adjustments and/or replacing worn parts, and then repeat the process to confirm that the corrective action resulted in appropriate alignment of the vehicle wheels. If necessary, the mechanic may repeat one or more steps of correcting alignment and re-testing, until all parameters are within acceptable tolerances. When complete, the system 111 can provide visual displays and/or printouts, for purposes of billings, reports to the customer, etc. Of note for purposes of the ACC sensor adjustment, the above discussed alignment processing measures and if necessary allows correction of "toe." The resulting correct toe may be stored and used to calculate the vehicle thrust line, with which the ACC sensor is to be aligned.

A host system 111 may be implemented on a specifically designed processing system, but in the example, it is implemented by a general-purpose computer controlled by software programming. Of course any of a number of different types of computer may be used, for wheel alignment or other applications, however, the example utilizes a device within the class commonly referred to as a personal computer or "PC." Although those familiar with the machine vision arts and/or the data processing art will generally be familiar with such computers and their associated software, it may be helpful to summarize the structural and functional aspects thereof as they might relate to the wheel alignment and ACC sensor adjustment example of FIGS. 1 and 2.

FIG. 3 provides a functional block diagram of the electronic processing elements of the machine vision system serving as the aligner 100. As shown, the system includes the image sensor modules 110 and 112 mounted on the camera beam 114 as well as the auxiliary auxiliary image sensor module 113. Each sensor module includes a communication interface, such as a USB interface or the like, to enable data communications with the host computer.

In the example of FIG. 3, the system utilizes a PC or workstation type implementation of a host computer system 251, which may serve as the host computer 111. In such an application, one function of the system 251 is to process the image data from the sensor modules 110 and 112 to determine wheel alignment parameters. The system 251 performs similar processing of image data from auxiliary sensor module 113. The system may run a number of other programs that are useful to the mechanic and/or other personnel in the auto shop.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For a PC type implementation, for example, at least one mass storage system 255 in the form of a disk drive or tape drive, stores the operating system and application software as well as data. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications. For purposes of the wheel alignment application, the interface 259 provides two-way data communications with the various imaging modules 110, 112 and 113. For example, the interface 259 may be a USB hub providing three or more ports for USB cable links to/from the imaging modules 110, 112 and 113. Although not shown, another communication interface may provide communication via a network, if desired. Such an additional interface may be a modem, an Ethernet card or any other appropriate data communications device.

The physical links to and from the communication interface(s) may be optical, wired, or wireless. For example, in a typical wheel aligner application, the imaging modules connect via USB cables. However, infrared, RF, and broadband wireless technologies may be used for these links. Any external communications may use hard wiring or wireless technologies.

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display, plasma screen or liquid crystal display (LCD). Although not shown, the PC type system 111 typically would include a port for connection to a printer. The input control devices for such an implementation of the system 251 would include the keyboard 258 for inputting alphanumeric and other key information. The input control devices for the system 251 may further include a cursor control device (not shown), such as a mouse, a touchpad, a trackball, a stylus, or cursor direction keys. The links of the peripherals 257, 258 and the like to the system 251 may be wired connections or use wireless communications.

The computer system 251 typically runs an operating system and a variety of applications programs, and the system stores data. Programmed operations of the system enable one or more interactions via the user interface, provided through elements such as 257 and 258, and implement the desired image processing. For machine vision applications, like wheel alignment and ACC sensor adjustment, the programming will include appropriate code to process the image data to produce the desired machine vision results. For example, when used to implement the host computer 111 for the wheel alignment system the programming enables the device 251 to process the image data to determine the desired alignment parameters. The programming will also process image data from the auxiliary module 113 to determine its coordinate system and derive the orientation of the stand 19 and/or the adjustment element 17 from the difference from the aligner's own coordinate system. The host 111 will typically run an application or shell specifically adapted to provide the user interface for input and output of desired information for alignment and related services. As noted, because it is a general purpose system, the device 251 may run any one or more of a wide range of other desirable application programs, some of which may involve machine vision but many of which may not.

The components contained in the computer systems 251 are those typically found in general purpose computer systems used as servers, workstations, personal computers, network terminals, and the like. In fact, these components are intended to represent a broad category of such computer components that are well known in the art.

At various times, the relevant programming for machine vision processing and any related application(s), such as the wheel alignment application and ACC sensor adjustment, may reside on one or more of several different media. For example, the programming may be stored on a hard disk and loaded into RAM for execution. The programming also may reside on or be transported by other media for uploading into the system 251, to essentially install the programming. Hence, at different times all or portions of the executable code or data for any or all of these software elements may reside in physical media or be carried by electromagnetic media or be transported via a variety of different media to program the particular system.

As used herein, terms such as computer or machine "readable medium" therefore refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in the computer 251 of FIG. 3. Volatile media include dynamic memory, such as main memory. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Once all wheel alignment measurements are complete, the computer generates a visual output of the measured alignment parameters and/or provides data relating to adjustments needed to bring the alignment parameters back to original manufacturer's specifications. The computer stores manufacturer-specified values and tolerances for the alignment parameters of many vehicles, and retrieves the appropriate information based on the make and model information input by the mechanic. The mechanic may take corrective action, for example, by making adjustments and/or replacing worn parts, and then repeat the process to confirm that the corrective action resulted in appropriate alignment of the vehicle wheels. If necessary, the mechanic may repeat one or more steps of correcting alignment and re-testing, until all parameters are within acceptable tolerances. When complete, the system can provide visual displays and/or printouts, for purposes of billings, reports to the customer, etc.

As part of the vehicle measurement operations, the host computer 111 computes the toe angles of the respective wheels from images of the target heads and determines the amount of correction (if any) required to the respective toe angles of the front and rear wheels.

The angle $\alpha$ of the thrust line from the centerline of the vehicle is also determined by the host computer. For example, the aligner system 100 may compute the thrust line of the vehicle 13, from the toe values (corrected if necessary) of the rear wheels of the vehicle. The thrust line data and possibly the toe angle data is stored for use in the subsequent ACC sensor alignment operation. Knowing the angle a of the thrust line from the centerline of the vehicle, the adaptive cruise control sensor 11 can thus be aligned so that the axis of the adaptive cruise control sensor 11 extends parallel to the thrust line.

In the example, two optical adjustment elements are used in the adjustment of an adaptive cruise control sensor mounted on the front of a host vehicle 13. One of these elements typically is a source of a visible light beam, such as a laser beam source. In such a case, the other adjustment element is a reflector, typically in the form of a flat reflecting mirror. To facilitate alignment of the adaptive cruise control sensor 11, either the beam source or the mirror is supported along the sensor axis; and the other one of the beam source and the mirror is arranged across the axis at a distance from the sensor. Accurate alignment of the sensor 11 requires careful arrangement of the mirror and/or the beam source. The support apparatus 19 facilitates arrangement of the mirror or beam source relative to the sensor axis and the thrust line and detection of alignment thereof relative to the thrust by the visual aligner system 100.

Turning now to the stand 19, those of skill in the art will recognize that the ACC sensor adjustment technique may utilize a number of different types of stand 19 for supporting the second sensor adjustment element 17 and the auxiliary image sensor module 113. Several examples of such a stand are described below, with reference to FIGS. 4 to 7.

Figure 4:
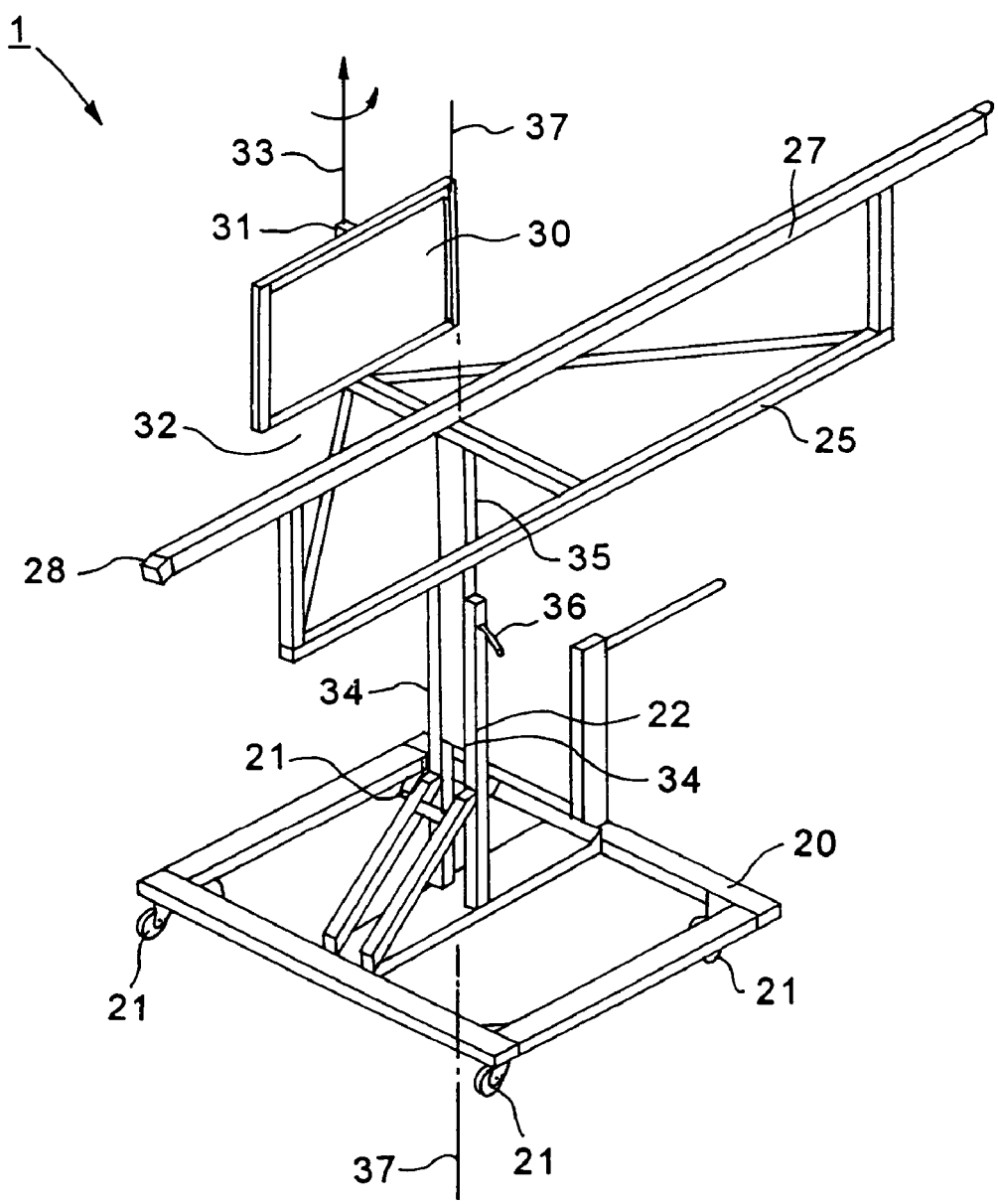
FIG. 4 is a perspective view of a first example of a stand and an adjustment element for facilitating adjustment of an adaptive cruise control sensor of the vehicle using an image processing type wheel aligner.

In the example of FIG. 4, the apparatus 1 includes a stand and one of the adjusting elements, in this case, a mirror 30. The mirror 30, here, functions as the mirror 17 discussed above. The mirror 30 is a double side mirror. Other adjustment element structures, however, could be supported on the stand.

The stand comprises a primary support. In the example of FIG. 4, the primary support includes a ground-engaging framework 20, which may be supported on four castors 21. A central pedestal 22 extending upwardly from the ground engaging framework 20 carries a secondary support, in this example, a secondary framework 25.

The secondary framework 25 in turn supports a carrier, for example, an elongated carrier bar 27. During alignment of an adaptive cruise control sensor 11, the bar 27 carries at least one auxiliary image sensor module 113 (see FIG. 1) and may carry two such modules at respective opposite ends of the carrier bar 27. At least one member is attached to the end of the bar to enable attachment of the image sensor module.

In the example of FIG. 4, a pair of mounting members 28 are mounted at respective opposite ends of the carrier bar 27, so that the module 113 may be attached at either end and or the stand may support two such modules. In the example, the mounting members 28 enable independent rotation of each attached module about a horizontal axis. This allows pivoting of the image sensor module about the horizontal axis, for aligning the sensor field of view with the target heads mounted on the vehicle (see FIG. 2). Once aligned with the camera(s) in the image sensor module(s), the mounting members 28 may be locked or rigidly clamped in position in relation to the bar 27.

In this example, the carrier bar 27 is of sufficient length for locating the auxiliary image sensor module(s) at the respective ends of the carrier bar 27 so that the target heads are visible when mounted on the wheels. The bar should provide at least a spacing end-to-end that is substantially the same distance (e.g. ±15%) as between the target heads would be spaced apart if mounted on the respective front or rear wheels of the vehicle 13. The bar 27 may provide a spacing similar (e.g. ±15%) to that provided by the beam 114.

The secondary support framework 25 is also adapted for mounting either one of the two optical sensor adjustment elements. The secondary support framework 25 may support either the laser light beam source or the light reflector, for co-operating with the other of the two adjustment elements, which would be mounted on the adaptive cruise control sensor 11 for facilitating alignment of the adaptive cruise control sensor 11 with the thrust line of the vehicle 13 (FIG. 1). In this example, the secondary framework 25 is adapted for carrying a light reflector, namely, the flat mirror 30. In use, the laser light beam source 15 is located on the adaptive cruise control sensor 11, and directs a laser light beam parallel to and close to the axis of the sensor 11.

Proper operation of a visual aligner system requires that the targets are within the field of view of the cameras in the imaging modules 110, 112 and 113. The spacing is dependent at least in part on the size of the targets. For example, with the targets used in the VISUALINER 3D system, the targets normally must be at least 1.3 m away from the cameras so that the aligner's target acquisition algorithm can detect the targets. The centers of the turntables (not shown) on which the front wheels rest during wheel alignment normally are 2.7 m away from the cameras. Of course, those skilled in the art will recognize that other dimensions would be appropriate for other types/sizes of targets.

As another relevant parameter, for alignment of the cruise control sensor using the laser beam source 15 and the mirror 30, the mirror 30 and the laser 15 must have some minimum separation. For example, typically the element (mirror or laser) that is mounted in front of the vehicle 13 must be 1.2–⅕ m away from the front of the vehicle. Typically, the front of the vehicle protrudes a distance forward from the axis of the front wheels (and thus forward from the centers of the turntables).

As a result of the vehicle structure and the parameters of the aligner and the sensor adjustment equipment, the element on the stand may need to be offset from the bar 27 supporting the auxiliary image sensor module(s) 113. In the example, the apparatus 1 is configured so that during sensor adjustment the mirror 30 is supported at an offset distance further away from the front of the vehicle than the bar 27, and thus from the axis of the targets. Depending on the precise distances, the stand may be turned 180° so that the offset places the mirror 30 closer to the vehicle 13 than is the bar 27. In the example, the mirror 30 is double sided, so that the system may operate in either orientation of the stand and mirror relative to the vehicle, and one reflective face of the mirror 30 will always face toward the host vehicle 13.

In this example, the mirror 30 is offset from the carrier bar 27 a distance, which may be approximately 800 cm. However, it will be readily apparent to those skilled in the art that other offsets between the mirror 30 and the carrier bar 27 may be used, depending on the particular model of aligner system 100 that is used. Indeed, in certain cases, it is envisaged that the mirror 30 may be mounted relative to the carrier bar 27 without any offset, if the adjustment elements and the aligner 100 will function properly with the resulting separations.

In this example, the mirror 30 is carried on a vertically extending mounting member 31, which is rotatably carried on the secondary framework 25 about a vertical axis 33 for facilitating alignment of the mirror 30 with the carrier bar 27 during calibration of the apparatus 1, so that the mirror 30 extends parallel to the carrier bar 27. In such an orientation, an axis of the bar 27 is perpendicular to an axis of direct (perpendicular) reflection of the surface of the mirror 30. If the stand supported the laser beam source, the beam axis would be perpendicular to the axis through the bar 27. A screw adjusting mechanism 32 extends between the mirror 30 and the secondary framework 25 for facilitating adjustment of the mirror 30 (or laser beam source) about the vertical axis 33 relative to the carrier bar 27.

The central pedestal 22 comprises a pair of upstanding spaced apart support members 34 which extend upwardly from the ground engaging framework 20 which slidably carry a central pod 35 extending downwardly from the secondary framework 25. A clamping member 36 clamps the central pod 34 to the support members 34 for locating the secondary support framework 25 at a desired height above the ground engaging framework 20.

The secondary framework 25 is rotatably carried on the central pod 35, and is rotatable relative to the central pod 35 about a vertical axis 37. A clamping mechanism (not shown) is provided for clamping the secondary framework 25 relative to the central pod 35, when the secondary framework 25 is in a position with the carrier bar 27 extending perpendicularly to the thrust line of the vehicle 13. Alternatively, a screw or other rotational adjustment and securing mechanism could be provided In use, it is assumed that the reflecting face of the mirror 30 is parallel to the axis of the bar 27; and use of the ACC sensor adjustment technique will include an appropriate procedure for calibrating the apparatus 1 for such alignment. During sensor adjustment, essentially, the wheel aligner system 100 is used to align the bar 27, and thus the mirror face, perpendicular to the vehicle thrust line. The laser 15 is mounted on the sensor 11 in close alignment with the axis thereof. When the source 15 emits the laser light beam, the beam reflects back off the face of the mirror 30. The sensor 11 is then adjusted, and the technician observes the spot of the reflected laser beam as it impacts on the front of the vehicle 13, until the light beam essentially reflects directly back on itself (back to its point of origin). At this point, the laser beam and the sensor axis are perpendicular to the face of the mirror 30 and thus parallel to the vehicle thrust line.

A more detailed description of an example of the sensor alignment procedure follows. With the vehicle 13 of which the adaptive cruise control sensor 11 is to be aligned is located relative to the 3D aligner 100 as illustrated in FIGS. 1 and 2. The front and rear wheels of the vehicle 13 are set at the correct toe angles, and in turn the angle α of the thrust line relative to the central angle is computed by the computer 251 of the host computer 111 of the aligner. After having carried out this normal wheel alignment using the 3D image aligner 100, the plane data of the rear wheel targets is saved on the aligner's computer. By saving this data, we preserve the coordinate system for reference and also the value of the thrust angle measured during the wheel alignment. The thrust angle α is also stored.

The apparatus 1 is then wheeled into position between the front of the vehicle 13 and the beam 114 supporting the regular image sensor modules 110, 112 of the 3D aligner system 100, as shown for example at 19 in FIG. 1. The carrier bar and possibly the mirror cross the vehicle thrust line. The auxiliary image sensor module 113, previously mounted in calibrated fashion to the bar 27 is connected to the host computer 111. In the example of FIG. 3, a USB cable runs from the auxiliary image sensor module 113 to a USB interface 259 on or otherwise connected to the computer 251. In this position, the camera in the module 113 is able to view one or more of the aligner's targets (see FIG. 2), and the image signals are supplied to the host computer 111 for further processing.

The technician operates the aligner system 100 to capture one or more digital images from the camera in the auxiliary image sensor module 113. The host computer 111 processes the signals from the auxiliary camera in the module 113, in the same manner as for the other aligner cameras, to determine the positions and orientations of the front target and possibly the back target in relation to the camera of module 113. The host computer 111 also has determined the positions and orientations of the targets in the aligner coordinate system, from its earlier processing of the images from the modules 110 and 112 in the wheel alignment analysis. The host computer 111 processes the position data derived from the camera of module 113 and the position data for the same target(s) derived from its normal image processing to determine the positions and orientation of the auxiliary camera's coordinate system in the coordinate system of the aligner system 100.

The orientation of the auxiliary camera (in module 113) is known with respect to the bar 27 and the mirror 30. Hence, the host 111 can determine the position of the device 1 with respect to the aligner's coordinate system. Using this information enables the aligning of the stand with the bar 27 perpendicular to the thrust line of the vehicle 13.

The bar 28 with the attached image sensing module(s) and the ACC adjustment element 30 can be moved in unison to achieve the desired orientation. This adjustment may be achieved by movement or rotation of the entire unit 1 on the castors 21. Alternatively, the secondary framework supporting the bar 28 and the mirror 30 may be adjusted rotationally on the central pod 35, about the substantially vertical axis 37 of the pedestal.

It is desired to position the device 1 so that the bar 27 and the mirror 30 are perpendicular to the vehicle thrust line. If they are not, the host computer will present an error, typically indicating direction and magnitude. Using this information, the technician can rotate elements of the device 1 to reduce or eliminate the error, and then a new image is captured from the camera of the auxiliary module 113. The host computer repeats its analysis of the orientation of the device and again indicates whether the orientation is as desired or if there is an error. This process of adjusting the orientation of the device 1 and taking measurements of its orientation is repeated as many times as needed, until the measurement for the apparatus 1 indicates the desired orientation. Once this condition has been met, the device 1 is orientated so that the reflective surface of the mirror 30 is perpendicular to the thrust line of the host vehicle 13.

At this stage, the carrier bar 27 expends transversely and perpendicularly to the thrust line, and the mirror 30 also extends perpendicularly to the thrust line 14. Hence, the apparatus 1 is located ready to adjust the alignment of the adaptive cruise control sensor 11 for the sensor alignment as per its own instructions.

The laser light beam source 15 on the adaptive cruise control sensor 11 is activated and the light beam is directed onto the mirror 30. The technician observes the reflected light beam from the mirror 30. If the reflected beam does not coincide with the laser light beam originating from the source 15, the technician adjusts the orientation of the adaptive cruise control sensor 11 until the reflected beam from the mirror 30 coincides with the laser light beam from the source 15. At that stage the adaptive cruise control sensor 11 and its axis are accurately aligned and parallel with the thrust line.

Figure 5:
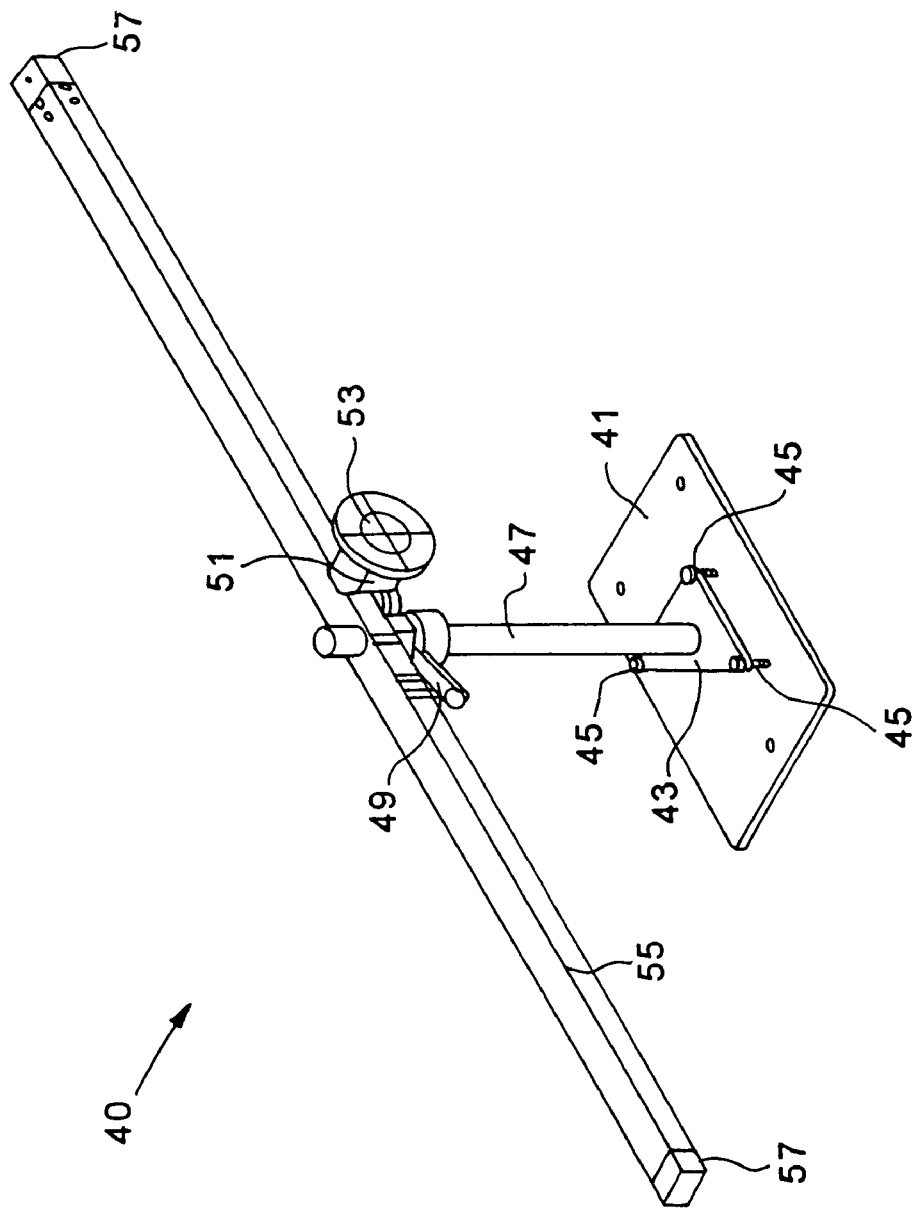
FIG. 5 is a perspective view of another example of a stand and an adjustment element for facilitating adjustment of an adaptive cruise control sensor of the vehicle using an image processing type wheel aligner.

Turning now to FIG. 5, there is illustrated an arrangement according to the present teachings, for adapting the apparatus disclosed in German Patent Specification No. 19857871 of Beissbarth to operate in conjunction with the 3D image wheel aligner or the like. The example is particularly suitable for adapting the apparatus shown in FIG. 4 of the German Specification No. 19857871.

In the example illustrated in FIG. 5 of this case, the device 40 includes a base plate 41, which supports the device 40 on a portion of the shop floor. A triangular intermediate plate 43 is adjustably supported on the base plate 41 by adjustable pins 45. The pins 45 may be threaded into the plate 43 and rest in corresponding sockets (not visible) in the base plate 41. Adjustment of the pins 45 enables angular adjustment of other elements of the device 40 supported by the plates. The two plates 41, 43 and the pins 45 form the ground engaging framework, although other arrangements of frames and/or plates may be used.

The device 40 further comprises a vertical pedestal or shaft 47 affixed to and supported by the triangular intermediate plate 43. A collar assembly generally indicated at 48 attaches to the top section of the vertical shaft 47. The collar may be adjustable vertically and angularly about the shaft, but in the example, the collar mechanism can be locked or clamped in a desired position/orientation on the shaft 47. In this example, the collar forms the support for the adjustment element and for a carrier bar to mount the auxiliary module 113 with its camera.

In this example, the adjustment system uses a laser source 51 as the stand mounted second adjustment element. A mirror (not shown) is attached to or provided with the ACC sensor 11, in an orientation perpendicular to the axis of emission/sensing of the sensor 11. The collar 48 supports the laser source 51 and a target plate 53 mounted so as to surround the emitting aperture of the laser source 51.

When the laser source 51 emits a beam parallel to the vehicle thrust axis, the laser beam impacts on the mirror associated with the ACC sensor 11. Since, the mirror is perpendicular to the propagation direction of the sensor beam, the beam will reflect back to its source (substantially in alignment with the aperture) when the sensor 11 is aligned parallel with the thrust line. In practice, the technician observes the reflection of the beam on the target plate 53 and adjusts the sensor 11 and the orientation of the associated mirror, until the beam spot of the target plate 53 substantially coincides with the emitting aperture of the laser source 51.

This ACC adjustment technique, however, is dependent on alignment of the device 40 so that the source 51 emits its beam parallel to the vehicle thrust line. The aligner system 100 is used to measure the orientation and adjust the position of the device 40 until the desired alignment is achieved, much like with the device 1. In this example, the collar 48 also supports a carrier bar 55 that extends perpendicular to the shaft 47, when the collar supports the laser and the bar on the shaft. When the shaft 47 is vertical, the bar 55 should be substantially horizontal.

The bar 55 is similar in length to the bar 27 in the device 1 of FIG. 4. The bar 55 has an attached mounting member 57 at one end, or at both its opposite ends as shown in the illustrated example. The mounting members 57 are similar to the members 28 in the previous example. The members 57 enable mounting one or more auxiliary image sensor modules 113 on the carrier bar 55 of the device 40.

Although not visible in the illustrated view, there is a screw on the reverse side of the stand that, when turned, allows the user to turn the bar 55 left or right, a bit like the steering in a car. The user turns this screw to orientate the bar 55 while looking at a dial on the computer screen, which tells the user him when the bar (and thus the adjustment element) is at the correct angle.

It may be helpful to consider one example of performing a sensor adjustment, at the end of a normal wheel alignment procedure, using the device 40. Specifically, the vehicle 13 of which the adaptive cruise control sensor 11 is to be aligned is located relative to the 3D aligner 100 as illustrated in FIGS. 1 and 2. The front and rear wheels of the vehicle 13 are set at the correct toe angles, and in turn the angle α of the thrust line relative to the central angle is computed by the computer of the host computer 111 of the aligner. After having carried out this normal wheel alignment measurement using the 3D image aligner 100, the plane data of the rear wheel targets is saved on the aligner's computer. By saving this data, we preserve the coordinate system for reference and also the value of the thrust angle measured during the wheel alignment. The thrust angle α is also stored.

The apparatus 40 is then positioned between the front of the vehicle 13 and the beam 114 supporting the regular image sensor modules 110, 112 of the 3D aligner system 100, much like in the example shown in FIG. 1. The bar 55 is across the thrust line, and the beam axis of source 51 should impact the surface of the mirror associated with the ACC sensor 11. The auxiliary image sensor module 113, previously mounted in calibrated fashion to the bar 55 is connected to the host computer 111. In the example of FIG. 3, a USB cable runs from the auxiliary image sensor module 113 to a USB interface 259 on or otherwise connected to the computer 251 (see FIG. 3). In this position, the camera in the module 113 is able to view one or more of the aligner's targets (see FIG. 2), and the image signals are supplied to the host computer 111 for further processing.

The technician operates the aligner system 100 to capture one or more digital images from the camera in the auxiliary image sensor module 113. The host computer 111 processes the signals from the auxiliary camera in the module 113, in the same manner as for the other aligner cameras, to determine the positions and orientations of the front target and possibly the back target in relation to the camera of module 113. The host computer 111 also has determined the positions and orientations of the targets in the aligner coordinate system, from its earlier processing of the images from the modules 110 and 112 during the wheel alignment analysis. The host computer 111 processes the position data derived from the camera of module 113 and the position data for the same target(s) derived from its normal image processing to determine the positions and orientation of the auxiliary camera's coordinate system in the coordinate system of the aligner system 100.

The orientation of the auxiliary camera (in module 113) is known with respect to the bar 27 and the mirror 30. Hence, the host 111 can determine the position of the bar 55 and the laser beam source 51 with respect to the aligner's coordinate system. Using this information enables the aligning of the device 40.

It is desired to position the device 40 so that the bar 55 is perpendicular to the thrust line of the vehicle 13 and thus the beam from the source 53 is parallel to that thrust line. If they are not, the host computer will present an error signal, typically indicating direction and magnitude. The technician can rotate the bar 55 on the shaft 47 (through the steering wheel and rotation on collar 49), and with it the source 51, to reduce or eliminate the error. Then a new image is captured from the camera of the auxiliary module 113. The host computer repeats its analysis of the orientation of the device and again indicates whether the orientation is as desired or if there is an error. This process of adjusting the orientation of the bar 55 of the device 40 and taking measurements of its orientation is repeated as many times as needed, until the measurement for indicates the desired orientation of the laser source 51.

Although described as separate steps, with the speed of today's digital equipment, the stand adjustment and position indication can proceed in real-time. The graphical user interface (GUI) displays the angle between the thrust angle and the bar. It also has a color of red if that angle is far off, or yellow as the angle gets close, or green if within a specified range of the exact desired angle. From the user's perspective, as he or she goes through this process, they simply turn the screw to orientate the bar 55, while looking at a dial displayed on the computer screen, which tells the user when the bar (and thus the adjustment element) is at the correct angle. The positional adjustment of the bar 55 provides a unified adjustment of the attached image sensing module and the ACC adjustment element 51 about the substantially vertical axis of the pedestal shaft 47. When the display confirms the desired orientation, the collar 49 is tightened or clamped to hold the bar 55 and the laser source 51 in the desired orientation. Once this condition has been met, the device 40 is orientated so that the beam from the source 53 is parallel to the thrust line vehicle 13.

At this stage the source 53 emits a laser beam that is parallel to the thrust line 14. Hence, the apparatus 40 is located and adjusted ready to adjust the alignment of the adaptive cruise control sensor 11 for the sensor alignment as per its own instructions. Although not shown here, a mirror in or associated with the sensor 11 extends perpendicularly to the axis of the sensor.

The laser light beam source 51 on the device 40 is activated and the light beam is directed onto the mirror associated with the sensor 11. The technician observes the reflected light beam from the mirror, for example, as it appears on the target plate 53. If the reflected beam does not coincide with the laser light beam originating from the source 51, the technician adjusts the orientation of the adaptive cruise control sensor 11 until the reflected beam from the mirror coincides with the laser light beam from the source 51. At that stage, the adaptive cruise control sensor 11 and its axis are accurately aligned and parallel with the thrust line.

In the example of FIGS. 6 and 7, the apparatus 60 includes a stand and one of the adjusting elements, in this case, a mirror 61. The mirror 61, here, functions as the mirror 17 discussed above. Other adjustment element structures, however, could be supported on the stand.

The stand comprises a primary support. In the example of FIGS. 6 and 7, the primary support includes a ground-engaging framework 63. The framework 63 provides tricycle type support at three corners. Two corners of the framework include wheels or rollers 65, for easy movement of the stand. For actual operational support, the tricycle undercarriage framework 63 is adjustably supported on the floor by three adjustable pins 67. The pins 67 are threaded through the material of the framework 63, and each pin 67 has an thumb wheel or the like for turning thereof to adjust the degree of threading of the respective pin through the framework and thereby adjust the height of the respective corner above the supporting floor. In this manner, manual turning of the pins 67 enables angular adjustment of other elements of the device 61 relative to horizontal and vertical axes. As noted above, other arrangements of frames and/or plates may be used as the ground-engaging framework.

The stand in the example of FIGS. 6 and 7 also includes central pedestal 69 extending upwardly from a plate 71 of the ground engaging framework 63. The pedestal 69 carries a secondary support, in this example, vertical panel 73. The device 60 further comprises a collar or clamp assembly, generally indicated at 75, which attaches to the vertical panel 73. The collar may be adjustable vertically and locked or clamped in a desired position on the support panel 73.

The clamp 75 in turn supports a carrier, for example, an elongated carrier bar 77. The attachment of the bar 77 may include one or more elements (not separately visible in the drawings) to allow positional adjustment thereof about the vertical axis in a manner analogous to that in the example of FIG. 5. Positional adjustment of the bar 77 provides unified rotational adjustment of the sensor module(s) 79, 81 and the mirror 61 about the substantially vertical axis of the pedestal 69.

During alignment of an adaptive cruise control sensor 11, the bar 77 carries at least one auxiliary image sensor module, and in the illustrated example, the bar 77 carriers two such modules 79 and 81 at respective opposite ends of the carrier bar 77. In this example, a pair of mounting members 83, 85 are provided at respective opposite ends of the carrier bar 77, so that each sensor module may be adjustably attached at the respective end. The mounting members 83, 85 enable independent rotation of each attached module 79 or 81 about a horizontal axis. This allows pivoting of the image sensor module about the horizontal axis, for aligning the sensor field of view with the target heads mounted on the vehicle (see FIG. 2). Once aligned with the camera(s) in the image sensor module(s), the mounting members 79, 81 may be locked or rigidly clamped in position in relation to the bar 77.

In this example, the carrier bar 77 is of sufficient length for locating the auxiliary image sensor modules 79, 81 at the respective ends of the carrier bar 77 so that the target heads are visible when mounted on the wheels of the host vehicle. The bar 77 may provide a spacing similar (e.g. ±15%) to that provided by the beam 114.

The carrier bar 77 also is adapted for mounting either one of the two optical sensor adjustment elements. The bar 77 may support either the laser light beam source or the light reflector, for co-operating with the other of the two adjustment elements, which would be mounted in association with the adaptive cruise control sensor 11 for facilitating alignment of the adaptive cruise control sensor 11 with the thrust line of the vehicle 13 (FIG. 1). In this example, the carrier bar 77 is adapted for carrying a light reflector, namely, the flat mirror 61. In use, the laser light beam source 15 is located on the adaptive cruise control sensor 11, and directs a laser light beam parallel to and close to the axis of the sensor 11 for reflection back by the mirror 61.

During sensor adjustment, essentially, the wheel aligner system 100 is used to align the bar 77, and thus the face of the mirror 61, perpendicular to the vehicle thrust line. Adjustment of the position of the stand to satisfy this condition is performed in a manner similar to the adjustment of the stand in the earlier examples. The laser 15 is mounted on the sensor 11 in close alignment with the axis thereof. When the source 15 emits the laser light beam, the beam reflects back off the face of the mirror 61. The sensor 11 is then adjusted, and the technician observes the spot of the reflected laser beam as it impacts on the front of the vehicle 13, until the light beam essentially reflects directly back on itself (back to its point of origin). At this point, the laser beam and the sensor axis are perpendicular to the face of the mirror 61 and thus parallel to the vehicle thrust line.

Those skilled in the art will recognize that the techniques described herein may be adapted to other applications. For example, the stand and adjustment elements could be used in combination with a visual image processing type system to align other types of sensors, e.g. including other sensors that may now or in future appear at different locations on various types of vehicles. The disclosed elements may be modified. As an example, a variety of other types of stand could be used in place of those shown in FIGS. 4 to 7 to support the second ACC sensor adjustment element and at least one of the auxiliary sensor modules.

As another example, recall that the adjustments of the stands described above were purely mechanical. Those skilled in the art will recognize that the stands may be modified to enable automatic adjustment, for example, in response to control signals from the host computer of the aligner. Also, the examples used bars that are capable of holding an image sensor module at each end, because the stands were adapted from units previously designed to hold two targets or two aligner heads. Such stands allow use of the image sensor module on either end of the bar or use of two such modules at opposite ends. However, several of the above described operations utilized only one image sensor module, hence it is also possible to use a stand and bar configuration with a bar of half the length and supporting only the one sensor module. Conversely, stands may be designed to support three or more sensor modules.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to encompass any and all modifications and variations that fall within the true scope of the present concepts.

What is claimed is:

1. A system for aligning a control sensor mounted on a host vehicle, the system comprising:
   a plurality of optical targets for mounting at predetermined points on the vehicle;
   an image processing aligner comprising at least one first image sensor and a processor for processing image signals representing an image containing one or more of the plurality of optical targets for computing a line of the host vehicle;
   two optical adjustment elements for cooperating to align an axis of the control sensor parallel to the line of the host vehicle, a first one of the optical adjustment elements being mountable in alignment with an axis of the control sensor and for movement with adjustment of the control sensor;
   a second image sensor for coupling to the processor of the image processing wheel aligner; and
   a stand for location across the line of the host vehicle, the stand mounting a second one of the adjustment elements and mounting the second image sensor to enable imaging of at least one of the targets through the second image sensor and processing of image signals from the second image sensor to facilitate alignment of the second of the adjustment elements relative to the line of the host vehicle.

2. The system as in claim 1, wherein the stand comprises:
   a ground engaging member;
   a vertical pedestal supported on the ground engaging member;
   a support mounted on the pedestal, for carrying the second one of the adjustment elements; and
   a carrier bar mounted with the support, for mounting of the second image sensor at a location spaced apart from a vertical axis of the stand.

3. The system of claim 2, wherein the stand further includes means for mounting the second image sensor for adjustable rotation about a substantially horizontal axis of the carrier bar.

4. The system of claim 2, wherein the stand further comprises means for mounting the bar and the support for unified adjustable rotation about a substantially vertical axis of the pedestal.

5. The system as in claim 1, wherein:
   the first adjustment element comprises a laser beam source; and
   the second adjustment element comprises a beam reflector.

6. The system as in claim 1, wherein:
   the first adjustment element comprises a beam reflector; and
   the second adjustment element comprises a laser beam source.

7. The system as in claim 1, wherein the aligner is a wheel aligner, and the optical targets are adapted for mounting on wheels of the host vehicle.

8. The system as in claim 7, wherein the at least one first image sensor of the aligner comprises a plurality of image sensing modules at spaced apart locations for imaging of the optical targets when the targets are mounted on the wheels of the host vehicle.

9. The system as in claim 8, wherein the second image sensor comprises a plurality of image sensing modules at spaced apart locations on the stand, for imaging of the optical targets when the targets are mounted on the wheels of the host vehicle.

10. The system as in claim 1, wherein the second image sensor comprises a plurality of image sensing modules at spaced apart locations on the stand, for imaging of the optical targets when the targets are mounted on the host vehicle.

11. A method of aligning a control sensor mounted on a host vehicle, the method comprising:
    mounting a first of two adjustment elements in alignment with an axis of the control sensor and for movement with adjustment of the control sensor;
    mounting a second of the two adjustment elements on a stand;
    mounting an image sensor of an image processing aligner on the stand, at a transversely spaced apart location relative to the second adjustment element;
    positioning the stand with the second adjustment element and the image sensor across a line of the host vehicle;
    processing images of one or more optical targets on the vehicle from the image sensor, to determine the line of the host vehicle and orientation of the second adjustment element on the stand relative to the line of the host vehicle, and adjusting the stand relative to the line of the host vehicle to achieve a desired orientation of the second adjustment element;
    transmitting a beam between the two adjustment elements; and
    during transmission of the beam, adjusting the position of the sensor and the aligned first adjustment element, until the beam is positioned so as to indicate a desired alignment of the axis of the control sensor relative to the line of the host vehicle.

12. The method of claim 11, wherein the line of the host vehicle is a thrust line determined in relation to wheels of the host vehicle.

13. The method of claim 11, wherein the desired orientation of the second adjustment element is perpendicular to the line of the host vehicle.

14. The method of claim 11, wherein the desired orientation of the second adjustment element is parallel to the line of the host vehicle.

15. A method of aligning a control sensor mounted on a host vehicle, the method comprising:
    mounting a first of two adjustment elements in alignment with an axis of the control sensor and for movement with adjustment of the control sensor;
    positioning a stand across a line of the host vehicle, wherein a second of the two adjustment elements is mounted on the stand and an image sensor of an image processing aligner is mounted on the stand at a location spaced apart from the second adjustment element;
    processing images of one or more optical targets on the vehicle from the image sensor, to determine the line of the host vehicle and orientation of the second adjustment element on the stand relative to the line of the host vehicle and adjusting the stand relative to the line of the host vehicle to achieve a desired orientation of the second adjustment element;
    transmitting a beam between the two adjustment elements; and during transmission of the beam, adjusting the position of the sensor and the aligned first adjustment element, until the beam is positioned so as to indicate a desired alignment of the axis of the control sensor relative to the line of the host vehicle.

16. The method of claim 15, wherein the line of the host vehicle is a thrust line determined in relation to wheels of the host vehicle.

17. The method of claim 15, wherein the desired orientation of the second adjustment element is perpendicular to the line of the host vehicle.

18. The method of claim 15, wherein the desired orientation of the second adjustment element is parallel to the line of the host vehicle.

* * * * *